July 28, 1931.  P. P. ADAMS  1,816,351
VEHICLE WHEEL
Filed Nov. 23, 1928

Inventor
PETER PAUL ADAMS
By
Oscar A. Michel
Attorney

Patented July 28, 1931

1,816,351

UNITED STATES PATENT OFFICE

PETER PAUL ADAMS, OF TURKEY RIVER, IOWA

VEHICLE WHEEL

Application filed November 23, 1928. Serial No. 321,436.

This invention relates to vehicle wheels and one of the objects thereof is to provide means for quickly and easily assembling a wheel in such a manner as to produce a light, strong and comparatively inexpensive wheel.

A further object is to provide dove tailed sockets having a narrower portion at one side of the hub than upon the other so that the tenon upon the spoke when inserted into the sockets or mortise will resist a sidewise or lateral thrust upon the spoke.

A further object is to provide the sockets upon the hub so that the narrower end occurs upon alternate sockets thereby forming a wheel in which there is the greatest strength against sidewise thrust.

A still further object is to provide a connection between the hub and the spokes wherein no securing means such as plates, bolts or rivets are required.

Another object is to provide sockets in the hub for the reception of similarly formed tenons upon the spokes whereby said spokes cannot be withdrawn radially from the hub.

With these and other objects in view which will be pointed out or are obvious as the description proceeds, the invention consists in the construction, arrangement and combination of the various parts of my device whereby the objects contemplated are attained as hereinafter more fully set forth, pointed out in the claims and illustrated in the accompanying sheet of drawings in which:

In the drawings like reference characters refer to like parts in the various figures.

The wheel comprises a hub, a portion of which is shown at 10. Arranged around the periphery of the hub are sockets 11. The sockets 11 gradually increase in size from one side of the hub to the other as shown particularly in Figure 3, the narrower portion being indicated at 12 and the wider portion at 13. The socket is also formed with a series of stepped dove tails as shown at 14 and 15 with the inner end of the socket of the smallest width so that it will not interfere with adjacent sockets.

Figure 3:
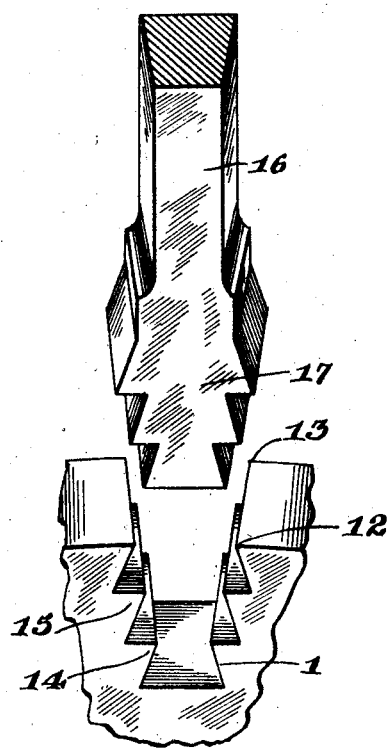
Figure 3 is a perspective view showing a portion of the hub with a socket and a portion of the spoke with the corresponding tenon for said socket.
Figure 2:
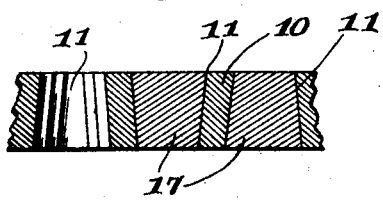
Figure 2 is a cross sectional view on the section line 2—2 of Figure 1.

The spoke 16 shown in Figure 3 is formed with a corresponding tenon 17. The tenon 17 is preferably made slightly larger than the mortise 11 so that it is necessary to drive the same into the mortise under pressure.

Figure 1:
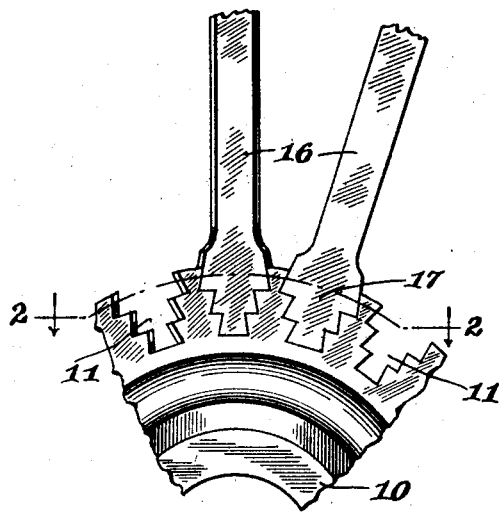
Figure 1 is a partial elevational view showing the connection between the spokes and the hub.

A very important feature of the invention consists in the alternate relation of the wide and narrow portions of the sockets and tenons as shown for instance in Figure 1 wherein the left hand socket has the wider portion thereof on the side of the hub facing the observer while the socket adjacent thereto has the narrower portion facing the observer. The extreme right hand socket 11 shown has the narrower portion facing the observer.

By means of applicant's construction the peculiar shape of the tenons even when the same are loosely fitted in the sockets prevents sidewise thrusts upon the spoke to a remarkable degree when the thrusts are delivered in the vicinity of the felly as they are in actual practice. Even when the tenon is loosely fitted in the socket it is impossible to remove the spoke from the hub by pressing laterally upon the end of the spoke near the felly from either direction. When the spokes have their tenons tightly fitted into the sockets it is impossible to dislodge the spoke even by a blow upon this narower portion since the adjacent spokes will take up the strain and prevent any movement upon the spoke subject to the sidewise thrust. It is therefore not necessary to make use of any side holding plates or bolts or rivets in order to secure these spokes to the hub.

It will be noted that the construction of the wheel is exceedingly simple and that a very sturdy and substantial structure is secured. This is due particularly to the wedging actions which are set up throughout the structure whenever subject to any shocks which would tend to disassemble the device.

Some changes may be made in the construction and arrangement of the invention above set forth without departing from the real spirit and purposes thereof, and it is my intention to cover by the following claims any modified forms of structure or use of equivalents which may be reasonably included within their scope.

I claim:

1. A wheel comprising a hub having a series of sockets arranged about the periphery thereof, each of said sockets wedged shaped axially and stepped wedged shaped radially, adjacent sockets arranged with their respective axial tapers in opposite directions and spokes insertable in the sockets from opposite ends of and axially with respect to the hub.

2. A wheel comprising a hub having a series of sockets arranged about the periphery thereof, each of said sockets wedged shaped axially and stepped wedged shaped radially, adjacent sockets arranged with their respective axial tapers in opposite directions and each of said sockets extending axially completely through the hub, and spokes having tenons seated within the sockets.

In testimony whereof I hereunto affix my signature.

PETER PAUL ADAMS.